US011311953B2

(12) United States Patent
Ohno et al.

(10) Patent No.: US 11,311,953 B2
(45) Date of Patent: Apr. 26, 2022

(54) MACHINE TOOL (71) Applicant: JTEKT CORPORATION, Osaka (JP)

(72) Inventors: Seiichi Ohno, Nagoya (JP); Minoru Sato, Okazaki (JP); Takuya Nakayama, Nagoya (JP); Tetsuro Furuhata, Nagoya (JP)

(73) Assignee: JTEKT CORPORATION, Osaka (JP)

( * ) Notice: Subject to any disclaimer, the term of this patent is extended or adjusted under 35 U.S.C. 154(b) by 136 days.

(21) Appl. No.: 16/596,018

(22) Filed: Oct. 8, 2019

(65) Prior Publication Data
US 2020/0114439 A1 Apr. 16, 2020

(30) Foreign Application Priority Data

Oct. 10, 2018 (JP) .............................. JP2018-191878

(51) Int. Cl.
*B23F 23/12* (2006.01)
*B23F 1/06* (2006.01)
(52) U.S. Cl.
CPC ............ *B23F 1/06* (2013.01); *B23F 23/1218* (2013.01)
(58) Field of Classification Search
CPC .. B23Q 3/1554; B23Q 3/155; B23Q 17/0971; B23Q 17/0995; B23F 1/06; B23F 23/1218
See application file for complete search history.

(56) References Cited

U.S. PATENT DOCUMENTS

| 4,942,657 | A | * | 7/1990 | Mihara | B23F 23/1281 409/231 |
| 8,316,742 | B2 | * | 11/2012 | Craig | G05B 19/124 82/1.11 |
| 2006/0270540 | A1 | * | 11/2006 | Takayama | B23Q 7/1431 483/41 |
| 2009/0234490 | A1 | * | 9/2009 | Suprock | B23B 31/02 700/159 |
| 2010/0041314 | A1 | * | 2/2010 | Kurashiki | B23F 23/00 451/10 |

(Continued)

FOREIGN PATENT DOCUMENTS

| JP | 58059726 | A | * | 4/1983 | ................ B23F 5/04 |
| JP | 62282814 | A | * | 12/1987 | ............ B23F 23/006 |

(Continued)

*Primary Examiner* — Nicole N Ramos
(74) *Attorney, Agent, or Firm* — Oblon, McClelland, Maier & Neustadt, L.L.P.

(57) ABSTRACT

A machine tool that generates internal teeth or external teeth on a cylindrical workpiece includes a workpiece holder, a column which is relatively movable to the workpiece holder, a rotary main spindle which is rotatable with respect to the column, a working tool which is held by the rotary main spindle, and a phase detecting unit which detects a phase of the working tool with respect to the rotary main spindle. The working tool includes a cutter portion which has cutters, a holder portion, and a detected portion which is formed on the holder portion. The phase detecting unit includes a detecting section which detects the detected portion, and a calculating section which calculates a phase angle of the detected portion with respect to a reference position of the rotary main spindle, based on a result detected by the detecting section.

7 Claims, 9 Drawing Sheets

(56) References Cited

U.S. PATENT DOCUMENTS

| | | | | |
|---|---|---|---|---|
| 2010/0145496 A1* | 6/2010 | Tang | ............... | B23Q 17/00 |
| | | | | 700/174 |
| 2013/0045667 A1* | 2/2013 | Katsuma | ............... | B23F 5/04 |
| | | | | 451/253 |
| 2018/0001405 A1 | 1/2018 | Natsuda et al. | | |

FOREIGN PATENT DOCUMENTS

| JP | 03213212 A | * | 9/1991 |
|---|---|---|---|
| JP | 6-55341 A | | 3/1994 |
| JP | 2018-1343 A | | 1/2018 |

\* cited by examiner

MACHINE TOOL

CROSS-REFERENCE TO RELATED APPLICATIONS

This application is based on and claims priority under 35 USC 119 from Japanese Patent Application No. 2018-191878 filed on Oct. 10, 2018, the contents of which are incorporated herein by reference.

TECHNICAL FIELD

The present disclosure relates to a machine tool.

BACKGROUND ART

JP H06-55341 A discloses a tool measurement device that measures the shape of a screw-like working tool that is used in gear machining. The tool measurement device disclosed in JP H06-55341 A moves a measurement probe in the X- and Y-axis directions while rotating the working tool about the axis, thereby measuring the shape of the screw-like working tool. On the other hand, JP 2018-001343 A discloses a gear cutting tool that is used in gear machining by skiving.

In gear machining by skiving, sometimes, hard machining (machining of high hardness workpieces) in which a coarsely machined workpiece is thermally processed by using another machine, and then the workpiece is finish machined, or other machining in which a workpiece such as a part of a synchronizer sleeve is machined by using a plurality of working tools is performed. In such machining, when a gear cutting tool that is mounted on a rotary main spindle is replaced with another gear cutting tool, phase matching between the gear cutting tool that is newly mounted on the rotary main spindle, and the workpiece in which a gear is formed must be performed. As a pre-stage of the phase matching between the gear cutting tool and the workpiece, moreover, the phase of the gear cutting tool that is newly mounted on the rotary main spindle, with respect to the rotary main spindle must be determined.

In the case where the phase of the gear cutting tool with respect to the rotary main spindle is to be determined based on the shapes of the cutters of the gear cutting tool, a long period of time is required. That is, the shapes of the cutters of the gear cutting tool that is used in the skiving process are complicated, and therefore it takes a lot of time and effort to know the shapes of the cutters that are mounted on the rotary main spindle. In a gear cutting tool, the helix angle and the like of each of the cutters is changed by regrinding. After each regrinding, therefore, the shapes of the cutters must be again measured, and it is required to correct the shape data of the cutters that are used as the reference in the phase determination. In gear machining by skiving, additionally, the replacement frequency of the gear cutting tool is high, and hence there is a request to shorten the time period required to determine the phase of the gear cutting tool with respect to the rotary main spindle.

SUMMARY OF INVENTION

The present disclosure is to provide a machine tool in which the time period required to determine of the phase of the working tool with respect to the rotary main spindle can be shortened.

According to an aspect of the present disclosure, a machine tool that generates internal teeth or external teeth on a cylindrical workpiece includes a workpiece holder which rotatably holds the workpiece, a column which is provided to be relatively movable with respect to the workpiece holder, a rotary main spindle which is provided to be rotatable with respect to the column, a working tool which is held by the rotary main spindle, and a phase detecting unit which is configured to detect a phase of the working tool with respect to the rotary main spindle. The working tool includes a cutter portion which has a plurality of cutters for cutting the workpiece, a holder portion which is provided to be integrally rotatable with the cutter portion, and which is detachably mounted on the rotary main spindle, and a detected portion which is formed on the holder portion. The phase detecting unit includes a detecting section which is configured to detect the detected portion, and a calculating section which is configured to calculate a phase angle of the detected portion with respect to a reference position of the rotary main spindle, based on a result detected by the detecting section.

According to the aspect of the present disclosure, the detecting section detects the detected portion that is disposed in the holder portion. Then, the calculating section calculates the phase angle (displacement) of the detected portion with respect to the reference position of the rotary main spindle based on the result of the detection by the detecting section, and determines the phase of the working tool. Namely, the phase detecting unit determines the phase of the working tool based on the position of the detected portion in which the shape is not changed by regrinding, and therefore, even in the case where the cutters are reground, it is not necessary to know the shapes of the cutters. In the machine tool, consequently, the time period required to determine the phase of the working tool with respect to the rotary main spindle can be shortened without depending on the shapes of the cutters.

DESCRIPTION OF EMBODIMENTS

1. Outline of Machine Tool 1

Figure 1:
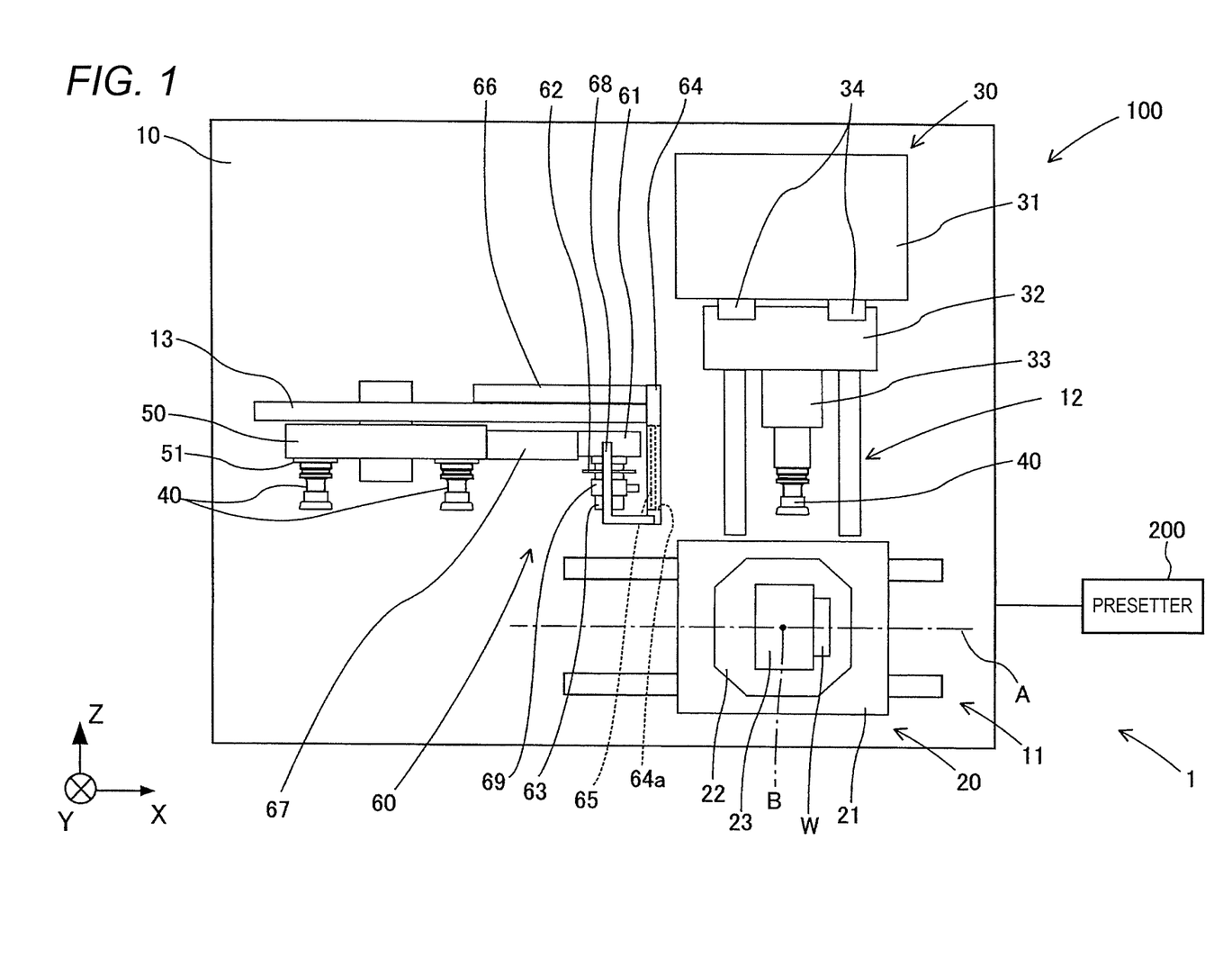
FIG. 1 is a plan view of a machine tool of an embodiment of the present disclosure.

Hereinafter, an embodiment to which the machine tool of the present disclosure is applied will be described with reference to the drawings. First, an outline of a machine tool 1 will be described with reference to FIG. 1. As shown in FIG. 1, the machine tool 1 mainly includes a gear machining device 100 and a presetter 200.

The gear machining device 100 is a machining center that has, as drive axes, three rectilinear axes (X, Y, and Z axes) orthogonal to one another, and two rotation axes (A and C axes). The embodiment will be described by exemplifying a case where internal teeth are generated on a cylindrical workpiece W by using the gear machining device 100. However, the gear machining device 100 may be used also in the case where external teeth are to be generated on the workpiece W. Moreover, the gear machining device 100 may be used, for example, also in the case where splines disposed in a synchronizer sleeve are to be machined. The presetter 200 measures various dimensions of working tools 40 that are used in machining of the workpiece W.

2. Gear Machining Device 100

As shown in FIG. 1, the machine tool 1 mainly includes a bed 10, a workpiece holder 20, a tool holding device 30, and the working tools 40. The bed 10 is formed into an approximately rectangular shape.

The workpiece holder 20 rotatably holds the workpiece W. The workpiece holder 20 includes a table 21, a swivel table 22, and a rotary table 23. The table 21 is placed on the bed 10. A pair of X-axis guide rails 11 that elongate in the X-axis direction (lateral direction in FIG. 1) are disposed on the bed 10. The table 21 is driven by a screw feed mechanism that is not shown, to reciprocally move in the X-axis direction.

The swivel table 22 is disposed on the table 21 so as to be swivelable about the B axis that is parallel to the Y-axis direction. The rotary table 23 is disposed on the swivel table 22 so as to be rotatable about the A axis that is orthogonal to the B axis. The workpiece W is held by the rotary table 23 so as to be rotatable integrally with the rotary table. The workpiece W that is held by the rotary table 23 rotates about the A axis along with the rotation of the rotary table 23.

The tool holding device 30 mainly includes a column 31, a saddle 32, and a rotary main spindle 33. The column 31 is placed on the top surface of the bed 10. A pair of Z-axis guide rails 12 that elongate in the Z-axis direction (vertical direction in FIG. 1) are disposed on the bed 10. The column 31 is driven by a screw feed mechanism that is not shown, to reciprocally move in the Z-axis direction. Therefore, the column 31 is disposed so as to be relatively movable with respect to the workpiece holder 20.

The saddle 32 is placed on one side surface of the column 31 that is parallel to a plane orthogonal to the Z-axis direction. A pair of Y-axis guide rails 34 that elongate in the Y-axis direction (direction perpendicular to the sheet of FIG. 1) are disposed on the side surface of the column 31. The saddle 32 is driven by a screw feed mechanism that is not shown, to reciprocally move in the Y-axis direction.

The rotary main spindle 33 is disposed so as to be rotatable relative to the column 31 and the saddle 32. Specifically, the rotary main spindle 33 is rotatably held by the saddle 32, and rotated by a spindle motor (not shown) housed in the saddle 32. One of the working tools 40 is held so as to be rotatable integrally with the rotary main spindle 33. The working tool 40 moves in the Z- and Y-axis directions with respect to the bed 10 along with the movement of the column 31 and the saddle 32.

Figure 2A:
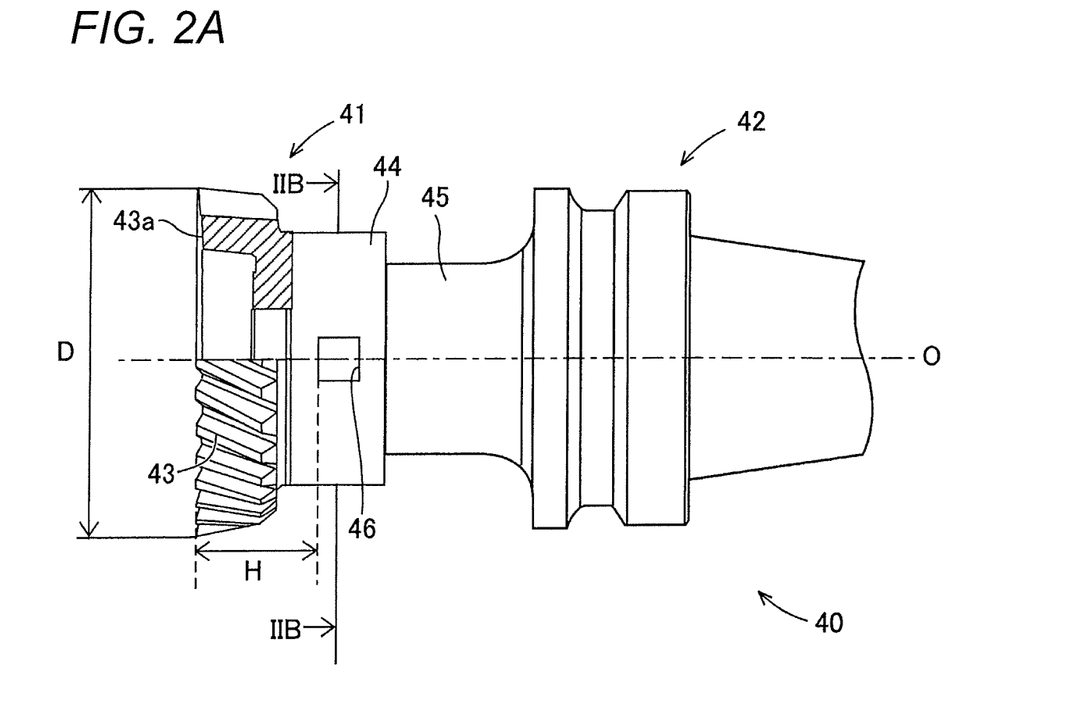
FIG. 2A is a partial enlarged side view of a working tool, showing a part of a cutter portion in section.

As shown in FIG. 2A, each of the working tools 40 includes a cutter portion 41 that has a plurality of cutters 43 for cutting the workpiece W, and a holder portion 42 that is disposed so as to be rotatable integrally with the cutter portion 41. The plurality of cutters 43 have a helix angle with respect to the central axis O of the working tool 40. The radially outer surface of each of the cutters 43 has a relief angle with respect to the central axis O of the working tool 40. The end surface 43a of the cutter 43 has a rake angle with respect to a plane orthogonal to the central axis O of the working tool 40.

The holder portion 42 includes a holder attachment portion 44 and a tool holder 45. The holder attachment portion 44 is an annular portion that is formed integrally with the cutter portion 41. The tool holder 45 is a columnar member. One side (the left side of FIG. 2A) of the tool holder 45 in the longitudinal direction is integrally rotatably attached to the holder attachment portion 44, and the other side (the right side of FIG. 2A) of the tool holder 45 in the longitudinal direction is detachably mounted on the rotary main spindle 33. Therefore, the working tool 40 rotates about the central axis O along with the rotation of the rotary main spindle 33 (see FIG. 1).

Figure 2B:
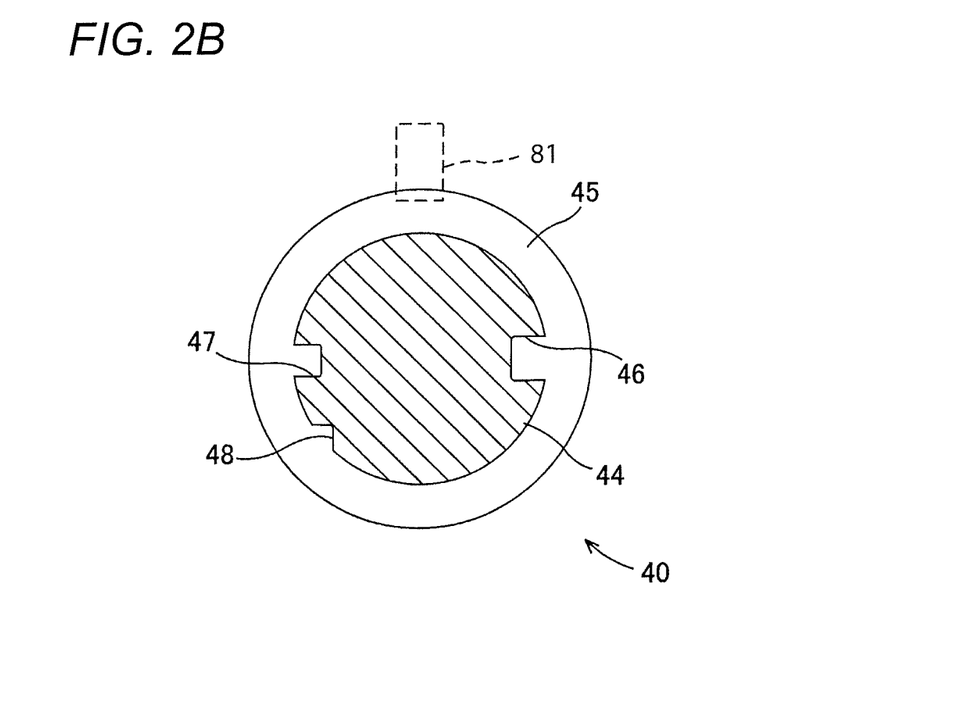
FIG. 2B is a section view of the working tool taken along line IIB-IIB in FIG. 2A, showing a detecting section 81 by a broken line.

As shown in FIG. 2B, the holder portion 42 further includes a detected portion 46 and two balancers 47, 48. The detected portion 46 and the two balancers 47, 48 are concave parts that are radially inwardly recessed from the outer circumferential surface of the holder attachment portion 44.

As described later, the detected portion 46 functions as the reference in the case where the phase angle (displacement) of the working tool 40 with respect to the rotary main spindle 33 is to be detected. The two balancers 47, 48 are disposed in order to offset dispersion that occurs in the centrifugal force generated in the holder attachment portion 44 during the rotation of the working tool 40, and that is caused by the detected portion 46. Specifically, the axial positions of the two balancers 47, 48 in the holder attachment portion 44 are equivalent to the axial position of the detected portion 46, and the circumferential positions of the two balancers 47, 48 in the holder attachment portion 44 are different from the circumferential position of the detected portion 46. Moreover, the radial dimensions of the two balancers 47, 48 are smaller than the radial dimension of the detected portion 46.

Figure 3:
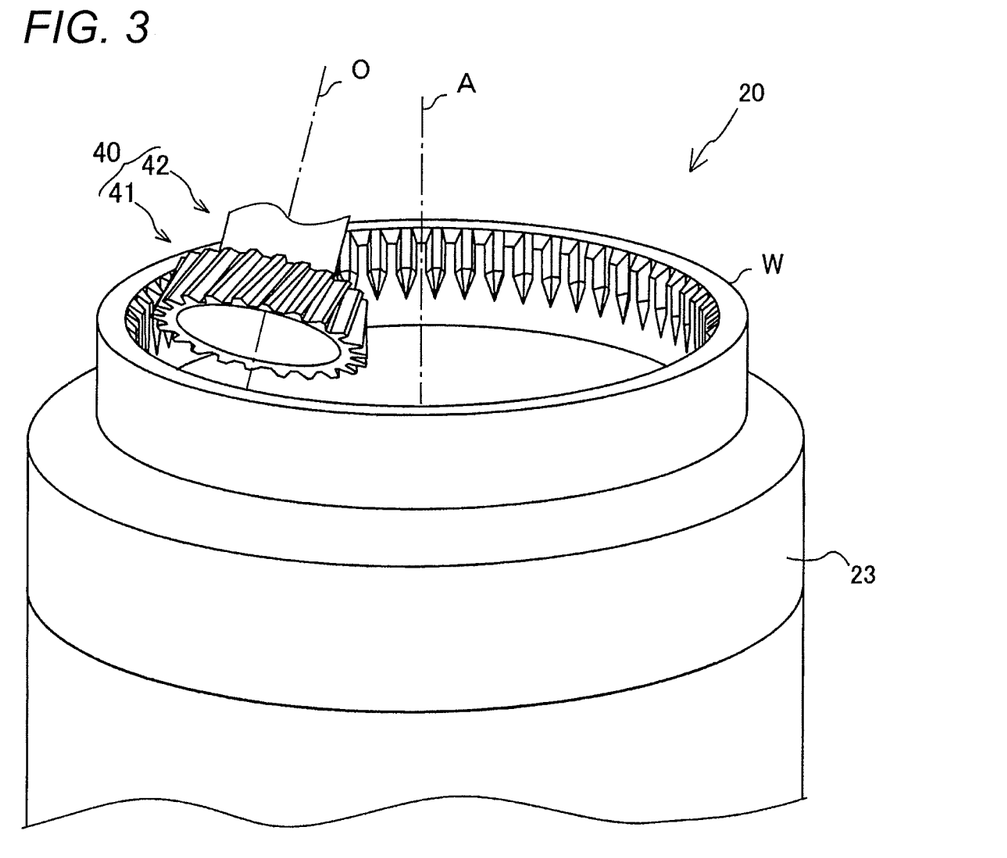
FIG. 3 is a view showing an operation of the working tool.

When internal teeth are to be generated on the inner circumferential surface of the workpiece W, as shown in FIG. 3, the gear machining device 100 performs the cutting work in which the working tool 40 and the workpiece W are fed in the rotation axis direction (A-axis direction) of the workpiece W while synchronously rotating the working tool 40 and the workpiece W. When the gear machining is to be performed, specifically, the gear machining device 100 swings the swivel table 22 (see FIG. 1) so as to attain the state where the central axis (A axis) of the workpiece W is inclined and twisted with respect to the central axis (O axis) of the working tool 40. In the state where the inclination angle of the swivel table 22 is maintained, thereafter, the gear machining device 100 relatively moves the working tool 40 in the A-axis direction while synchronously rotating the working tool 40 and the workpiece W. At this time, a relative speed difference is produced between the workpiece W and the working tool 40, and, in the portion that is contacted with one of the cutters 43, the inner circumferential surface of the workpiece W is cut.

Returning to FIG. 1, the description of the gear machining device 100 will be continued. The gear machining device 100 includes a tool magazine 50 and a tool replacing device 60. The tool magazine 50 houses the plurality of working tools 40. In FIG. 1, in order to simplify the drawing, only two tools 40 are illustrated. A planer support plate 13 is fixed to the top surface of the bad 10, and the tool magazine 50 is rotatably disposed on the support plate 13.

The tool replacing device 60 replaces the working tool 40 mounted on the rotary main spindle 33 with another tool 40 housed in the tool magazine 50. The tool replacing device 60 is placed between the tool magazine 50 and the tool holding device 30 in the X-axis direction.

The tool replacing device 60 mainly includes a device main unit 61, a replacement arm 62, an arm motor 63, a frame portion 64, a door 65, a moving member 66, and a tool holding portion 67. The device main unit 61 is disposed on the bed 10. The replacement arm 62 is rotatably disposed on the device main unit 61 about the axis that is parallel to the Z axis. Hook-like grasping portions 62a (see FIG. 5A) that can grasp the tool holder 45 are formed in the both longitudinal ends of the replacement arm 62, respectively. The arm motor 63 is a motor for producing a driving force for rotating the replacement arm 62.

The frame portion 64 is placed in a position which is closer to the column 31 than the support plate 13, and between the tool magazine 50 and the tool holding device 30 in the X-axis direction. In the frame portion 64, an opening portion 64a is formed in a position which is opposed to the replacement arm 62 in the X-axis direction. The opening portion 64a is disposed between the column 31 and the device main unit 61 in the X-axis direction. The door 65 is disposed on the frame portion 64 to open and close the opening portion 64a.

A spring that is not shown is disposed in the frame portion 64. When the door 65 is wound up by the urging force of the spring, the opening portion 64a is opened. An actuator (not shown) that is coupled to the door 65 is disposed in the frame portion 64. When the actuator is driven, and the door 65 is spread against the urging force of the spring, the opening portion 64a is closed.

The moving member 66 is disposed on the support plate 13 on the side that is opposite to the device main unit 61. Moreover, a screw feeding mechanism that is not shown is disposed on the support plate 13 on the surface that is opposite to that on which the tool magazine 50 is mounted. The moving member 66 is disposed so that the member can be relatively moved with respect to the support plate 13 in the X-axis direction by the screw feeding mechanism. The moving member 66 is formed integrally with the frame portion 64, and the device main unit 61 is coupled to the frame portion 64 through a bracket 68. Namely, the device main unit 61 and the frame portion 64 are disposed so as to be integrally movable in the X-axis direction along with the movement of the moving member 66.

The tool holding portion 67 is disposed on the device main unit 61 and movable integrally with the device main unit 61. The tool holding portion 67 holds one of the working tools 40 that is to be replaced with another tool 40 which is mounted on the rotary main spindle 33. An actuator that is not shown is disposed on the device main unit 61, and the tool holding portion 67 holds the working tool 40 that is taken out from the tool magazine 50 by the actuator.

The tool replacing device 60 further includes a detecting-section arm 69 that holds a detecting section 81 (see FIG. 5A) which will be described later. The detecting-section arm 69 is fixed to the arm motor 63 in a position that is more remote from the device main unit 61 than the replacement arm 62. The detecting-section arm 69 is extendable and contractible, and telescopically driven by an actuator that is not shown.

Figure 4:
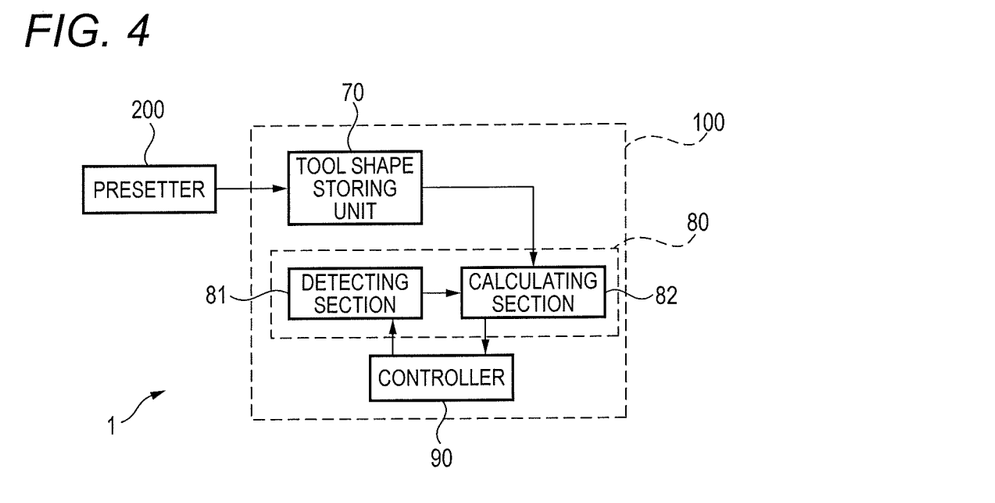
FIG. 4 is a block diagram of a gear machining device.

As shown in FIG. 4, the gear machining device 100 further includes a tool shape storing unit 70 and a phase detecting unit 80. The tool shape storing unit 70 stores at least one data relating to the shapes of the working tools 40. Specifically, measurement results of the axial lengths H of the working tools 40, and outer diameters D of the cutter portions 41 that are measured by the presetter 200 (a value measured by the presetter 200) are stored in the tool shape storing unit 70. The presetter 200 measures, as the axial length H of each of the working tools 40, the distance from the edge tip (axial tip end of the working tool 40) of at least one of the cutter 43 disposed in the cutter portion 41, to the detected portion 46. The presetter 200 may measure the helix angles of the cutters 43 of the working tool 40. In this case, the gear machining device 100 can calculate the phase angle (displacement) based on the tip position (angle) and ground amount in the case of, for example, grinding of the working tool 40.

The phase detecting unit 80 detects the phase of the working tool 40 with respect to the rotary main spindle 33 (see FIG. 1). The phase detecting unit 80 includes the detecting section 81 and a calculating section 82. The detecting section 81 is a sensor that is used in detection of the detected portion 46. The detecting section 81 is held by the detecting-section arm 69 (see FIG. 1). In the gear machining device 100, the detecting section 81 can be made close to the holder attachment portion 44 of the working tool 40 mounted on the rotary main spindle 33, by extending the detecting-section arm 69. Although, in the embodiment, the detecting section 81 is a non-contact eddy current sensor, the detecting section may be, for example, a contact touch probe sensor.

Based on the result of the detection by the detecting section 81, the calculating section 82 obtains by calculation the phase angle (displacement) of the detected portion 46 with respect to the predetermined reference position of the rotary main spindle 33. The calculating section 82 further obtains by calculation the tip position of the cutter 43 (see FIG. 2A) based on the at least one data stored in the tool shape storing unit 70 (see FIG. 1).

A controller 90 generally controls the gear machining device 100. The controller 90 performs, for example, controls of: the positions of the column 31 and the saddle 32; and the rotation of the rotary main spindle 33, and controls relating to: the operations of the tool magazine 50 and the tool replacing device 60; and execution of the sensing performed by the detecting section 81 of the phase detecting unit 80.

3. Operation of Gear Machining Device 100 in Replacement of Tools 40

Figure 5A:
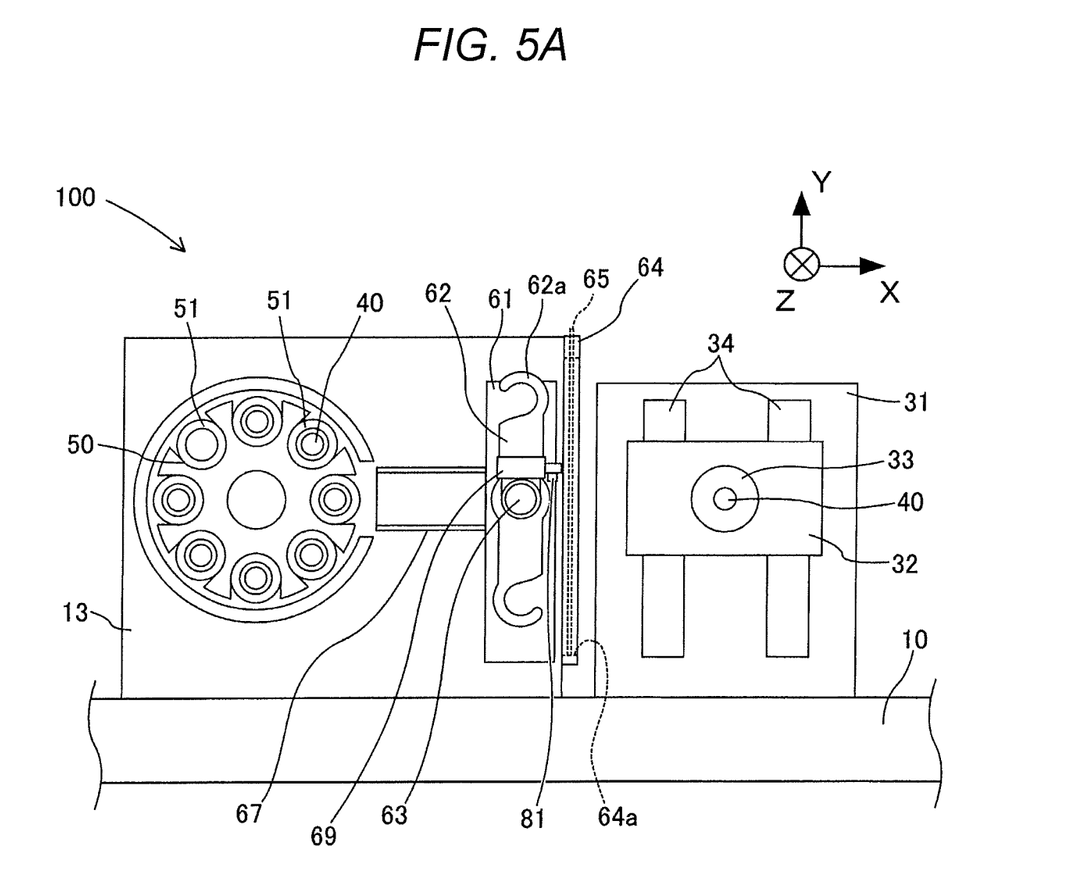
FIG. 5A is a front view of the machine tool.

Referring to FIGS. 5A to 5D, next, the operation of the gear machining device 100 that is performed when the working tools 40 are replaced with each other will be described. As shown in FIG. 5A, a plurality of sockets 51 are detachably mounted on the tool magazine 50, and the working tools 40 are housed in the sockets 51, respectively.

Before the replacement of the working tools 40 by the tool replacing device 60 is started, the controller 90 swivels the tool magazine 50 to place the working tool 40 to be next used, in the position opposed to the tool holding portion 67. The tool replacing device 60 is placed in the position where the device does not interfere with the column 31 as viewed in the Z-axis direction, and the replacement arm 62 is held in the state where the longitudinal direction is oriented in the Y-axis direction.

At this time, the replacement arm 62 and the detecting-section arm 69 are placed on the side of the tool magazine 50 from the frame portion 64, and the opening portion 64a is closed by the door 65. In the gear machining device 100, during gear machining, a machining area that is on the side of the column 31, and a non-machining area that is on the side of the tool magazine 50 are defined by the door 65 in this way. In the gear machining device 100, therefore, chips, coolant, and the like that adhere to the working tool 40 mounted on the rotary main spindle 33 can be prevented from scattering toward the tool magazine 50 through the opening portion 64a, and hence chips, coolant, and the like can be prevented from adhering to the tools 49 housed in the tool magazine 50, and the detecting section 81.

Figure 5B:
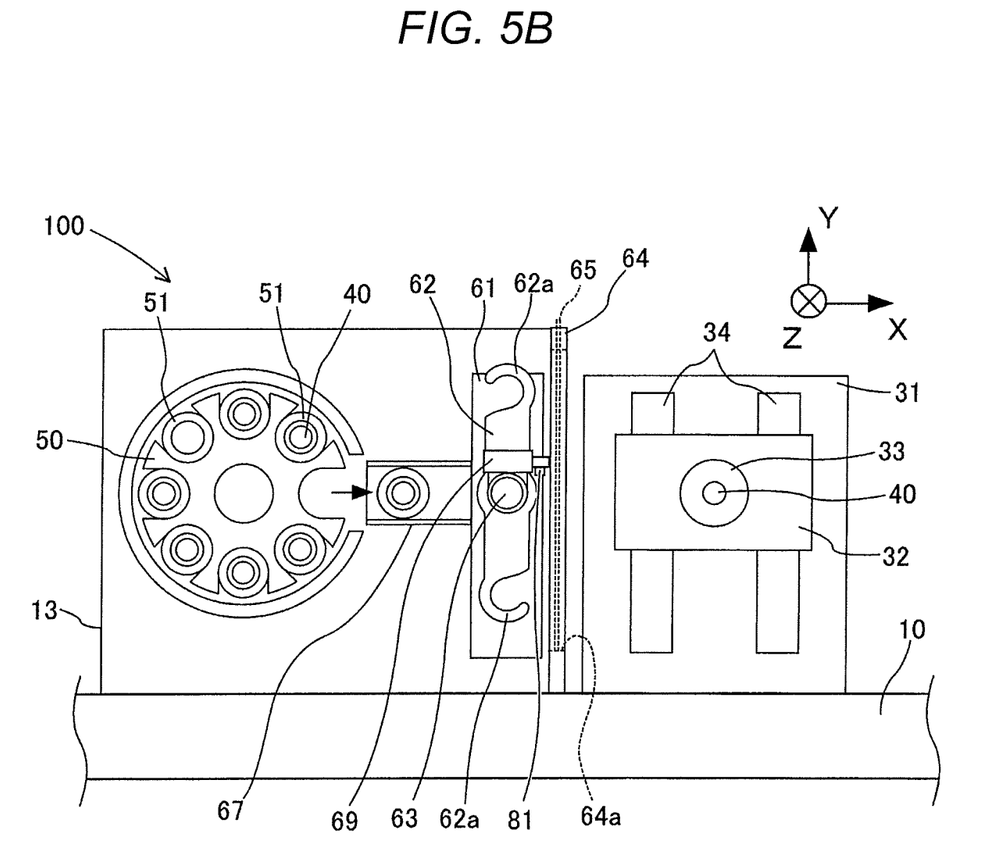
FIG. 5B is a front view of the machine tool, showing a state where, from the state shown in FIG. 5A, one working tool that is housed in a tool magazine is moved to a tool holding portion.

As shown in FIG. 5B, the working tool 40 and socket 51 that are indexed to the position opposed to the tool holding portion 67 are transferred to the tool holding portion 67 by the actuator that is not shown. Then, the working tool 40 that is transferred to the tool holding portion 67 is placed in a position where the tool can be grasped by the replacement arm 62.

Before the replacement of the working tools 40 is started, the controller 90 causes the column 31 to retract in the direction (the leftward direction in FIG. 1) in which the column separates from the table 21, and places the column 31 in the position where the column does not interfere with the tool replacing device 60. At the timing when the column 31 retracts to a position where interference with the tool replacing device 60 is avoidable, the controller 90 causes the device main unit 61 to move toward the machining area (the right side of FIG. 1). Moreover, the controller 90 stops the rotation of the rotary main spindle 33, moves the saddle 32, and places the working tool 40 mounted on the rotary main spindle 33, in a position where the tool can be grasped by the replacement arm 62.

Figure 5C:
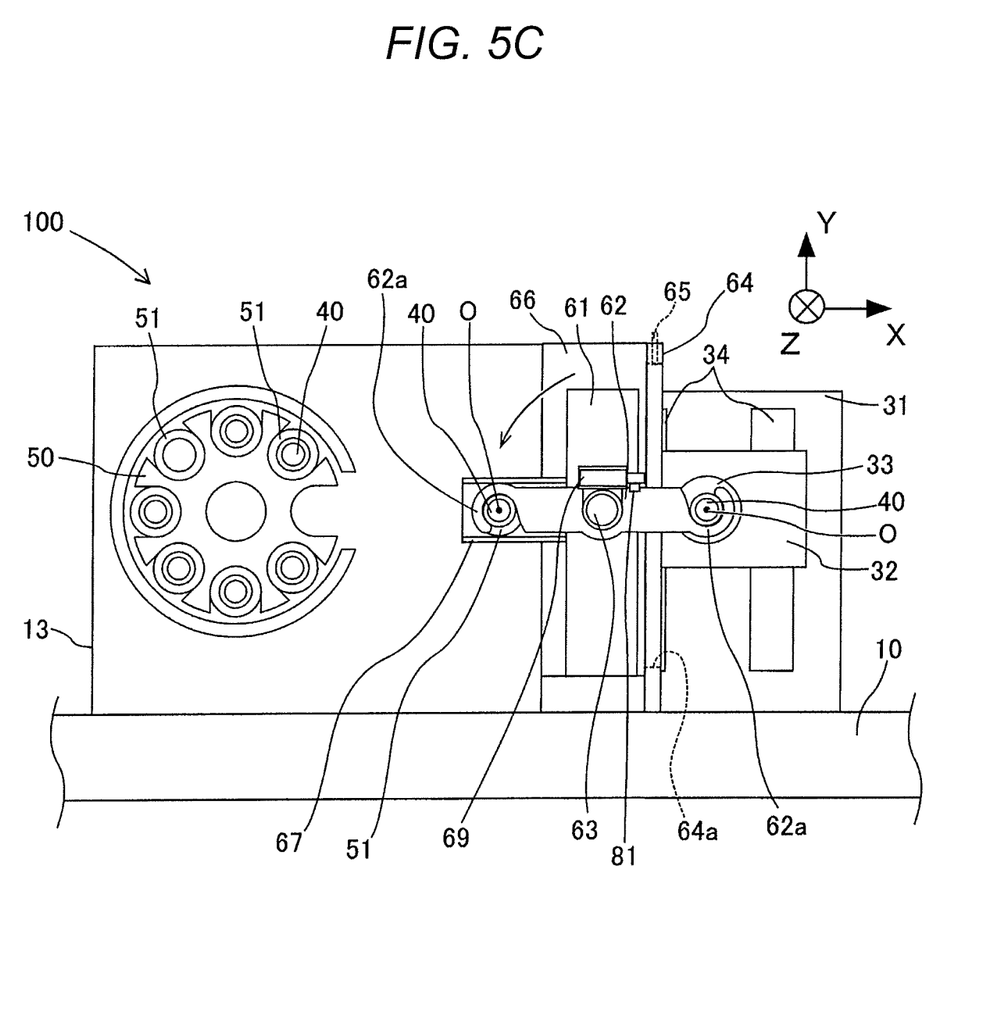
FIG. 5C is a front view of the machine tool, showing a step of replacing the working tool by a replacement arm.

As shown in FIG. 5C, the device main unit 61 stops in a position where the distance from the central axis O of the working tool 40 mounted on the rotary main spindle 33 to the rotation axis of the replacement arm 62 is equal to that from the central axis O of the working tool 40 held by the tool holding portion 67 to the rotation axis of the replacement arm 62. Then, the controller 90 opens the door 65, and causes the replacement arm 62 to swing by 90 degrees in the counterclockwise direction shown in FIG. 5C.

Thereafter, the replacement arm 62 grasps both the working tool 40 mounted on the rotary main spindle 33, and the working tool 40 held by the tool holding portion 67, and detaches the working tools 40, 40 from the rotary main spindle 33 and the tool holding portion 67, respectively. Then, the replacement arm 62 swings in the counterclockwise direction in FIG. 5C, to move the working tool 40 detached from the tool holding portion 67, to the mounting position with respect to the rotary main spindle 33, and the working tool 40 detached from the rotary main spindle 33 to a housing position with respect to the tool holding portion 67, respectively. The working tools 40, 40 are mounted on the rotary main spindle 33 and the tool holding portion 67, respectively, and thereafter the replacement arm 62 swings by 90 degrees in the clockwise direction shown in FIG. 5C.

Figure 5D:
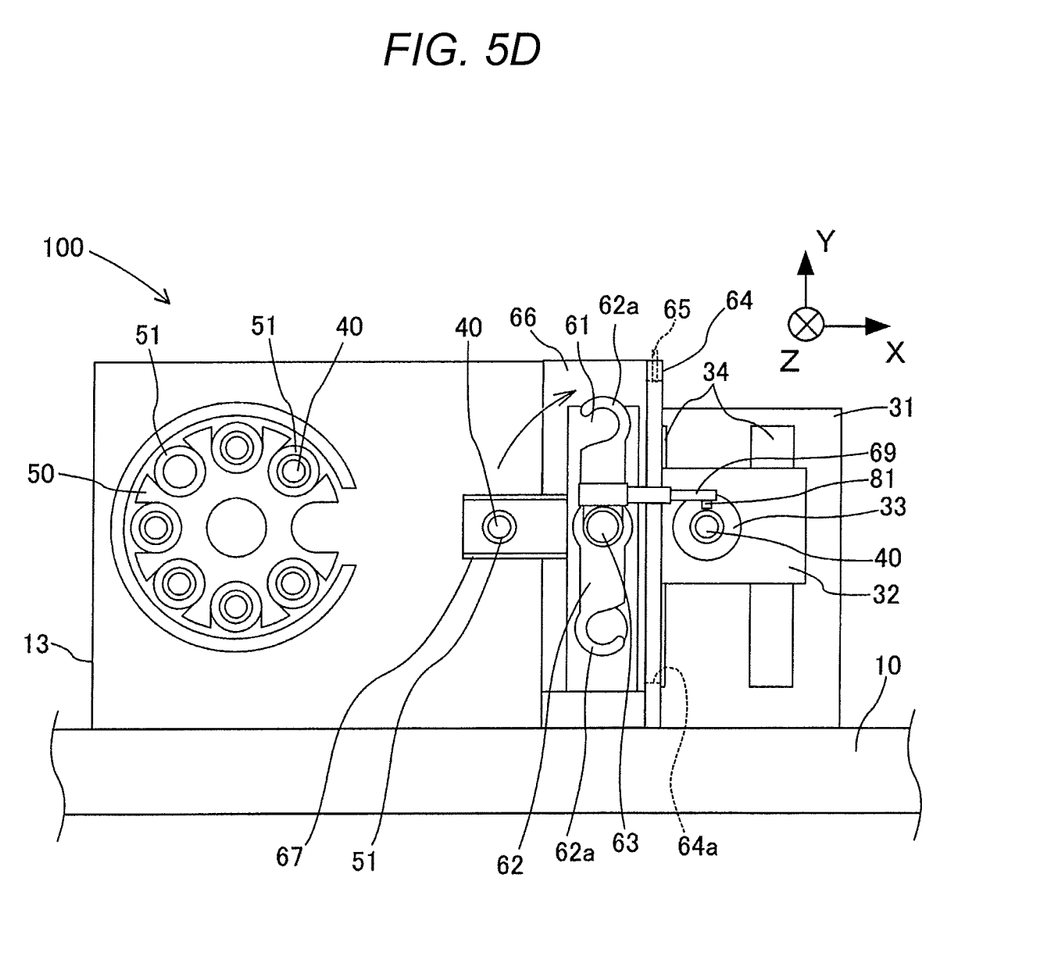
FIG. 5D is a front view of the machine tool, showing a state where sensing is performed by the detecting section on a holder attachment portion of the working tool mounted on a rotary main spindle.

After the replacement of the working tools 40 by the tool replacing device 60 is ended, as shown in FIG. 5D, the controller 90 causes the detecting-section arm 69 to extend. Then, the controller 90 places the detecting section 81 in a sensing position where the holder attachment portion 44 of the working tool 40 that is mounted on the rotary main spindle 33 can be subjected to sensing. Thereafter, the controller 90 performs sensing by using the detecting section 81, while driving the rotary main spindle 33 to rotate the working tool 40.

In accordance with this, the calculating section 82 identifies the position of the detected portion 46 based on the result of the detection performed by the detecting section 81. Then, the calculating section 82 obtains by calculation the phase angle (displacement) of the detected portion 46 with respect to the reference position of the rotary main spindle 33. The calculating section 82 further obtains by calculation the tip position of the cutter 43 of the working tool 40 mounted on the rotary main spindle 33, based on the at least one data that are stored in the tool shape storing unit 70, and that relate to the shape of the working tool 40.

When the sensing performed by the detecting section 81 is ended, the controller 90 causes the detecting-section arm 69 to retract from the sensing position. Moreover, the controller 90 causes the device main unit 61 to move toward the non-machining area (the left side of FIG. 1), and the opening portion 64a is closed by the door 65. At the timing when the tool replacing device 60 is moved to in the position where the device does not interfere with the column 31 as viewed in the Z-axis direction, the controller 90 causes the column 31 to advance to be close to the table 21, and starts the cutting work.

4. Phase Detecting Process

Figure 6:
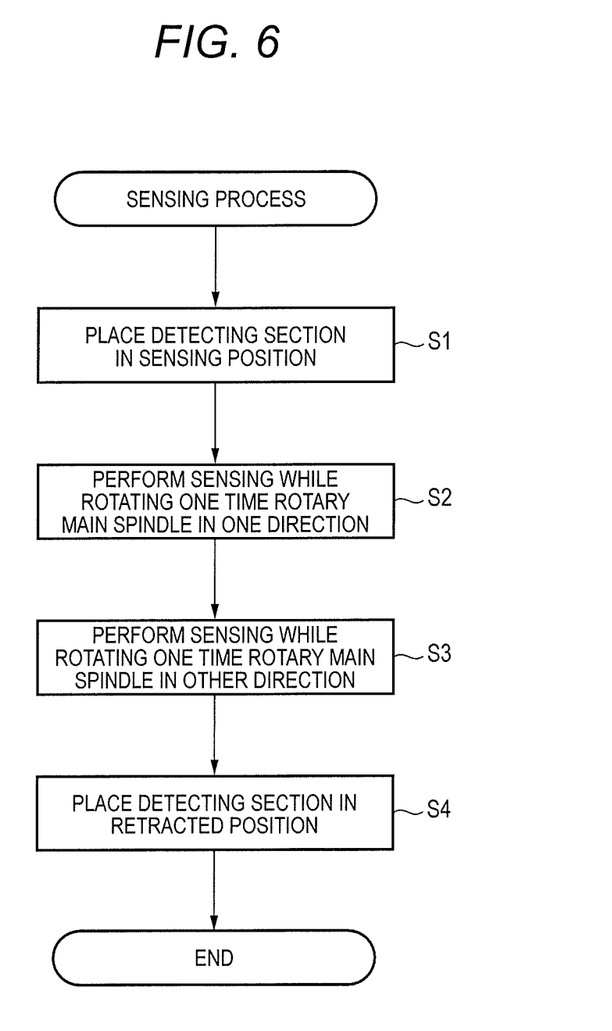
FIG. 6 is a flowchart showing a sensing process that is executed by a controller.
Figure 7A:
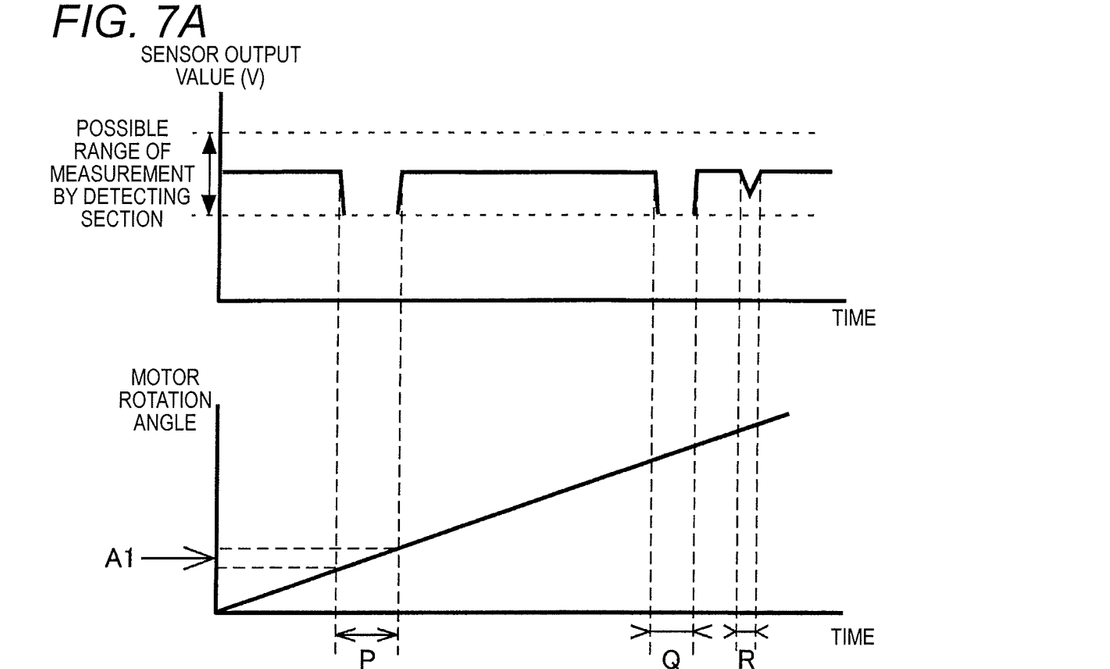
FIG. 7A is a graph showing detection results in the case where sensing is performed on a holder attachment portion while rotating the rotary main spindle in one direction.
Figure 7B:
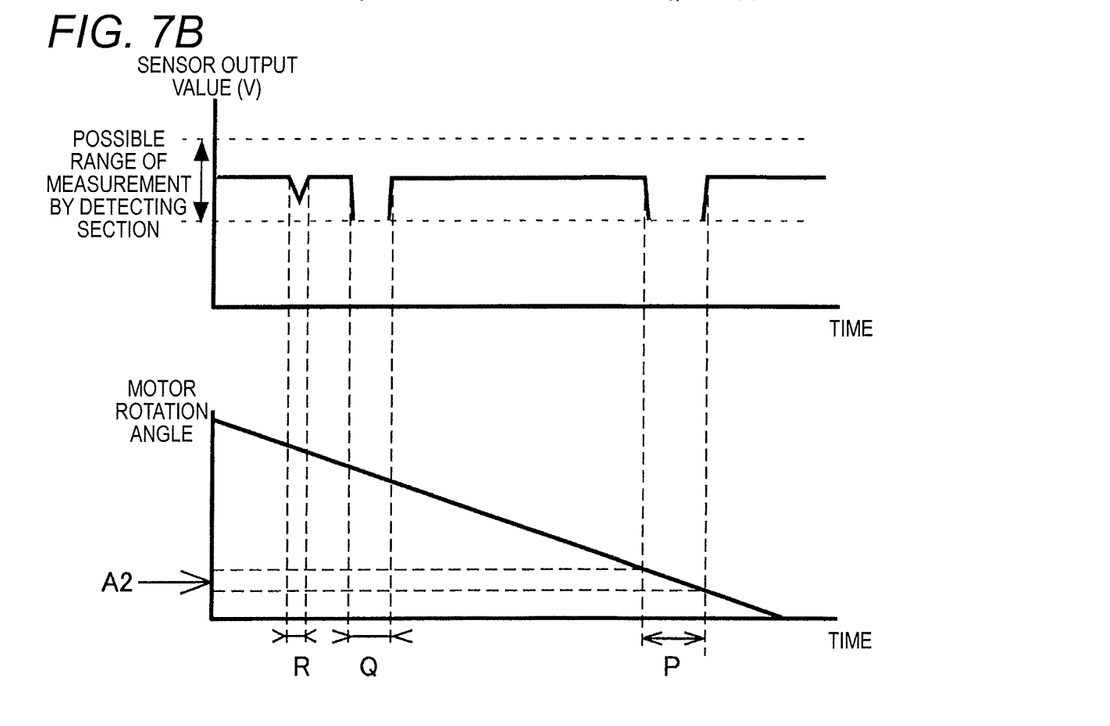
FIG. 7B is a graph showing detection results in the case where sensing is performed on the holder attachment portion while rotating the rotary main spindle in the other direction.

Referring to FIGS. 6 to 7B, next, the process of detecting the phase of the detected portion 46 by the phase detecting unit 80 will be described with reference to an example. Referring to the flowchart shown in FIG. 6, first, a sensing process that is executed by the controller 90 will be described. The sensing process is a process that is executed after the working tool 40 is mounted on the rotary main spindle 33. In the process, sensing is applied to the outer circumferential surface of the holder attachment portion 44 by the detecting section 81, and the position of the detected portion 46 is detected.

In the sensing process, as shown in FIG. 6, the controller 90 initially causes the detecting-section arm 69 to extend so as to place the detecting section 81 in the position where the outer circumferential surface of the holder attachment portion 44 can be subjected to the sensing process (S1).

Next, the controller 90 causes the detecting section 81 to perform sensing, while rotating one time the rotary main spindle 33 at a constant speed in one direction (S2). Then, the controller 90 causes the detecting section 81 to perform sensing, while rotating one time the rotary main spindle 33 at the constant speed in the other direction (opposite to the direction in the process of step S2) (S3). Thereafter, the controller 90 causes the detecting-section arm 69 to contract, whereby the detecting section 81 is retracted from the sensing position and placed in the non-machining area (S4), and then the process is ended. In the sensing process, as described above, the controller 90 causes the detecting section 81 to perform sensing, while rotating the working tool 40 in the both directions.

Referring to FIGS. 7A and 7B, then, a calculating process that is performed by the calculating section 82 will be described. FIG. 7A is a graph showing detection results in the case where, in the process of step S2 that is executed in the sensing process, sensing is performed by the detecting section 81 while rotating the rotary main spindle 33 in the one direction. FIG. 7B is a graph showing detection results in the case where, in the process of step S3 that is executed in the sensing process, sensing is performed by the detecting section 81 while rotating the rotary main spindle 33 in the other direction. In FIGS. 7A and 7B, the detection results show a sensor output value of the detecting section 81.

When sensing is performed while rotating the rotary main spindle 33, the distance between the holder attachment portion 44 and the detecting section 81 is approximately constant in the portions where the detected portion 46 and the two balancers 47, 48 are not formed. During periods when sensing is applied to the portions where the detected portion 46 and the two balancers 47, 48 are not formed, therefore, the sensor output value of the detecting section 81 is approximately constant.

By contrast, when the position of sensing by the detecting section 81 is transferred from one of the portions where the detected portion 46 and the balancers 47, 48 are not formed, to one of the portions in each of which one of the detected portion 46 and the two balancers 47, 48 is formed, the sensor output value of the detecting section 81 is lowered. In the result of the detection by the detecting section 81, therefore, the calculating section 82 can determine that, during the period when sensing is performed while rotating the working tool 40 in one time, there are three time periods (P, Q, R) when the sensor output value is lowered. In other words, the calculating section 82 can determine that the detected portion 46 and balancers 47, 48 of the holder attachment portion 44 are in the respective positions where the detecting section 81 performs sensing when the sensor output value is lowered.

In addition, the detected portion 46 is larger in width in the circumferential direction than the two balancers 47, 48. Therefore, the calculating section 82 can determine that the detected portion 46 is in the position where sensing is performed during the time period (P) in which the sensor output value is lowered, and which is longest among the three time periods when the detecting section 81 has no signal output. Moreover, one of the two balancers 47, 48, i.e., the balancer 47 is larger in width in the circumferential direction than the other balancer 48. Therefore, the calculating section 82 can determine the positions where the two balancers 47, 48 are formed respectively.

When sensing is applied to the outer circumferential surface of the holder attachment portion 44 by the detecting section 81 while rotating the working tool 40, the bottom surface of the detected portion 46 and that of the one balancer 47 pass through positions which are separated from the possible range of measurement by the detecting section 81. During sensing of the detected portion 46 and the one balancer 47, therefore, the detecting section 81 has no sensor output. By contrast, the bottom surface of the other balancer 48 passes through the possible range of measurement by the detecting section 81. In sensing of the other balancer 48, therefore, the lowering of the sensor output value can be observed, but the sensor output value is not lowered to zero. Consequently, the calculating section 82 can identify the position of the other balancer 48 depending on the presence or absence of the sensor output value.

In the case where the rotary main spindle 33 is rotated faster, an error may sometimes occur between the position of the detected portion 46 that is known based on the signal output of the detecting section 81, and the actual position of the detected portion 46. Therefore, the calculating section 82 obtains by calculation a first center position A1 of the detected portion 46 that is identified by performing sensing by the detecting section 81 while rotating one time the rotary main spindle 33 in the one direction, and a second center position A2 of the detected portion 46 that is identified by performing sensing by the detecting section 81 while rotating one time the rotary main spindle 33 in the other direction. Thereafter, the calculating section 82 obtains by calculation the intermediate position A (A=(A1+A2)/2) between the first center position A1 and the second center position A2, and sets the obtained position as the position of the to-be-detected part 46. As a result, the phase detecting unit 80 can correctly detect the position of the detected portion 46.

In the phase detecting unit 80, when the phase of the working tool 40 is to be determined, as described above, the detected portion 46 that is disposed in the holder attachment portion 44 is detected by the detecting section 81. Then, the calculating section 82 calculates the phase angle (displacement) of the detected portion 46 with respect to the reference position of the rotary main spindle 33 based on the result of the detection performed by the detecting section 81, and determines the phase of the working tool 40. Namely, the phase detecting unit 80 determines the phase of the working tool 40 based on the position of the detected portion 46 the shape of which is not changed by regrinding, and therefore, even in the case where the cutters 43 are reground, it is not necessary to know the shapes of the cutters 43. In the machine tool 1, consequently, the time period required to determine the phase of the working tool 40 with respect to the rotary main spindle 33 can be shortened.

Moreover, the detected portion 46 is a concave part that is radially inwardly recessed from the outer circumferential surface of the holder attachment portion 44. Therefore, the calculating section 82 can easily know a change of the sensor output value in the result of the detection by the detecting section 81, and hence the position of the detected portion 46 can be surely identified.

In the machine tool 1, furthermore, the axial lengths H of the working tools 40, and the outer diameters D of the cutter portions 41 are measured by the presetter 200. Even in the case where the cutters 43 are reground, therefore, the axial lengths H of the working tools 40, and the outer diameters D of the cutter portions 41 can be correctly measured. On the other hand, instead of the measurement of the shapes of the cutters 43 in which the presetter 200 is used, the machine tool 1 obtains by calculation the phase angle (displacement) of the detected portion 46 with respect to the reference position of the rotary main spindle 33, by using the phase detecting unit 80. In the machine tool 1, in this case, the time period required to determine the phase of the working tool 40 with respect to the rotary main spindle 33 can be shortened as compared with the case where the cutter portion of the cutter 43 is identified by the presetter 200 and the like, and the phase of the working tool 40 is determined based on the identified edge position of the cutter 43.

When the distance from the detected portion 46 to the edge of the cutter 43 is measured as the axial length H of the working tool 40, the presetter 200 can correctly measure the axial length H of the working tool 40.

The tool holder 45 is disposed separately from the holder attachment portion 44 that is formed integrally with the cutter portion 41. When the working tool 40 is subjected to measurement performed by the presetter 200 in the state where the tool holder 45 is detached from the holder attachment portion 44, the measurement by the presetter 200 can be efficiently performed by the degree corresponding to the size reduction of the measurement object.

5. Others

Although the present disclosure has been described with reference to the embodiment, the present disclosure is not limited to the embodiment, and it can be easily inferred that the embodiment can be variously modified or improved without departing from the purpose of the present disclosure. Although, for example, the embodiment in which the detected portion 46 is a concave part that is radially inwardly recessed from the outer circumferential surface of the holder attachment portion 44 has been described, the detected portion 46 may be a convex part that is radially outwardly projected from the outer circumferential surface of the holder attachment portion 44. Also in the case, the calculating section 82 can easily know a change of the sensor output value in the result of the detection by the detecting section 81, and therefore the position of the detected portion 46 can be surely identified.

Although the embodiment in which the detected portion 46 is formed in the outer circumferential surface of the holder attachment portion 44 has been described, the detected portion 46 may be formed in the outer circumferential surface of the tool holder 45. Although the embodiment in which the tool holder 45 is formed separately from the cutter portion 41 and the holder attachment portion 44, and detachably mounted on the holder attachment portion 44 has been described, the present disclosure is not limited to this, and the tool holder 45 may be formed integrally with the holder attachment portion 44.

Although the embodiment in which the detecting section 81 is held by the detecting-section arm 69 that is disposed on the device main unit 61 of the tool replacing device 60 has been described, the present disclosure is not limited to this. For example, the detecting section 81 may be fixed to the column 31, the saddle 32, or the like of the tool holding device 30. In this case, the detecting section 81 is movable integrally with the column 31. In the gear machining device 100, therefore, the detecting section 81 can apply sensing to the holder attachment portion 44 after a new working tool 40 is mounted on the rotary main spindle 33, and while the column 31 is then moved from the tool replacement position to the machining position. In the gear machining device 100, consequently, the time period required from the completion of the replacement of the working tool 40 to the start of machining on the workpiece W can be shortened.

Although the embodiment in which the detected portion 46 is formed so that the part is larger in width in the circumferential direction than the two balancers 47, 48 has been described, the detected portion 46 is requested to have a shape that is different from at least the balancers, and that enables the calculating section 82 to identify the position based on the result of the detection by the detecting section 81. For example, the detected portion 46 may be formed so that the part is smaller in width in the circumferential direction than the balancers, or that the part is different in depth from the balancers.

Although the embodiment in which the balancers 47, 48 are formed in the holder attachment portion 44 has been described, the balancers 47, 48 may be omitted. In this case, the shape of the holder portion 42 of the working tool 40 can be simplified. When, in this case, sensing is applied to the holder attachment portion 44 while rotating the rotary main spindle 33, the controller 90 is not always required to cause the rotary main spindle 33 to make one rotation. In the case where one concave part is formed in the holder attachment portion 44 on which sensing is applied, when the rotary main spindle 33 is rotated in one direction, namely, the rotation in the one direction of the rotary main spindle 33 may be stopped at the timing when the position of the concave portion can be identified (the timing when the lowering or the like of the sensor output value is confirmed). Therefore, the controller 90 can shorten the time period required to detect the phase angle of the working tool 40 with respect to the rotary main spindle 33.

Although the embodiment has been described in which the calculating section 82 identifies the position of the detected portion 46 based on the result of the detection in which sensing is performed by the detecting section 81 while rotating the working tool 40 in one direction, and that of the detection in which sensing is performed by the detecting section 81 while rotating the working tool 40 in the other direction, the present disclosure is not limited to this. Namely, the calculating section 82 may identify the position of the detected portion 46 based on only the result of the detection in which sensing is performed while rotating the working tool 40 in one direction or in the other direction. Therefore, the controller 90 can shorten the time period required to determine the phase angle of the working tool 40 with respect to the rotary main spindle 33.

REFERENCE SIGNS LIST

1: machine tool
20: workpiece holder
30: tool holding device
31: column
33: rotary main spindle
40: working tool
41: cutter portion
42: holder portion
43: cutter
44: holder attachment portion
45: tool holder
46: detected portion
60: tool replacing device
61: device main unit
62: replacement arm
64a: opening portion
65: door
69: detecting-section arm
70: tool shape storing unit
80: phase detecting unit
81: detecting section
82: calculating section
90: controller
100: gear machining device
200: presetter
D: outer diameter of cutter portion
H: axial length of working tool
O: central axis of working tool
W: workpiece

What is claimed is:

1. A machine tool that generates internal teeth or external teeth on a cylindrical workpiece, the machine tool comprising:
   a workpiece holder which is configured to rotatably hold the workpiece;
   a column which is provided to be relatively movable with respect to the workpiece holder;
   a rotary main spindle which is provided to be rotatable with respect to the column;
   a working tool which is held by the rotary main spindle; and a phase detector which is configured to detect a phase angle of the working tool with respect to the rotary main spindle, wherein the working tool includes:
- a cutter portion which has a plurality of cutters for cutting the workpiece;
- a holder portion which is provided to be integrally rotatable with the cutter portion, and which is detachably mounted on the rotary main spindle; and
- a detected portion which is formed on the holder portion, wherein the phase detector includes:
- a sensor which is configured to detect the detected portion; and
- a controller configured to calculate the phase angle of the detected portion on the holder portion of the working tool, with respect to a reference position of the rotary main spindle, based on the detection by the sensor of the detected portion, and wherein the detected portion is a concave portion recessed inward from an outer circumferential surface of the holder portion in a radial direction of the working tool.

2. The machine tool according to claim 1, wherein the machine tool further comprises:
- a tool shape storer configured to store at least one data relating to a shape of the working tool; and
- a presetter which is configured to measure an axial length of the working tool and an outer diameter of the cutter portion, wherein the tool shape storer stores a value measured by the presetter.

3. The machine tool according to claim 2, wherein the presetter measures a distance from the detected portion to an edge tip of at least one of the cutters, and
wherein the distance is measured as the axial length of the working tool.

4. The machine tool according to claim 1, wherein the holder portion includes:
- a holder attachment portion which is formed integrally with the cutter portion; and
- a tool holder which is formed separately from the holder attachment portion, and is detachably mounted on the rotary main spindle, wherein the detected portion is formed on the holder attachment portion.

5. The machine tool according to claim 1, wherein the controller is configured to perform a control relating to the rotary main spindle and the phase detector, and
wherein, when the phase of the working tool with respect to the rotary main spindle is detected, the detected portion is detected by the sensor while the controller controls a rotation of the working tool mounted on the rotary main spindle in one direction, and
wherein, subsequently, the detected part is again detected by the sensor while the controller controls the rotation of the working tool in the other direction.

6. The machine tool according to claim 1, wherein the machine tool further comprises a tool replacing device which is configured to replace the working tool mounted on the rotary main spindle with another working tool, and
the tool replacing device includes:
- a device main body;
- a replacement arm which is rotatably disposed on the device main body;
- an opening portion which is disposed between the device main body and the column;
- a door which is configured to open or close the opening portion; and
- a detecting-section arm which holds the sensor, and is configured to move the detected portion between a side of the column and a side of the device main body.

7. The machine tool according to claim 1, wherein the sensor is disposed on the column.

* * * * *